E. J. BEST & C. M. FITCH.
VEHICLE SIGNAL.
APPLICATION FILED DEC. 27, 1910.
1,028,854.
Patented June 11, 1912.
2 SHEETS—SHEET 1.
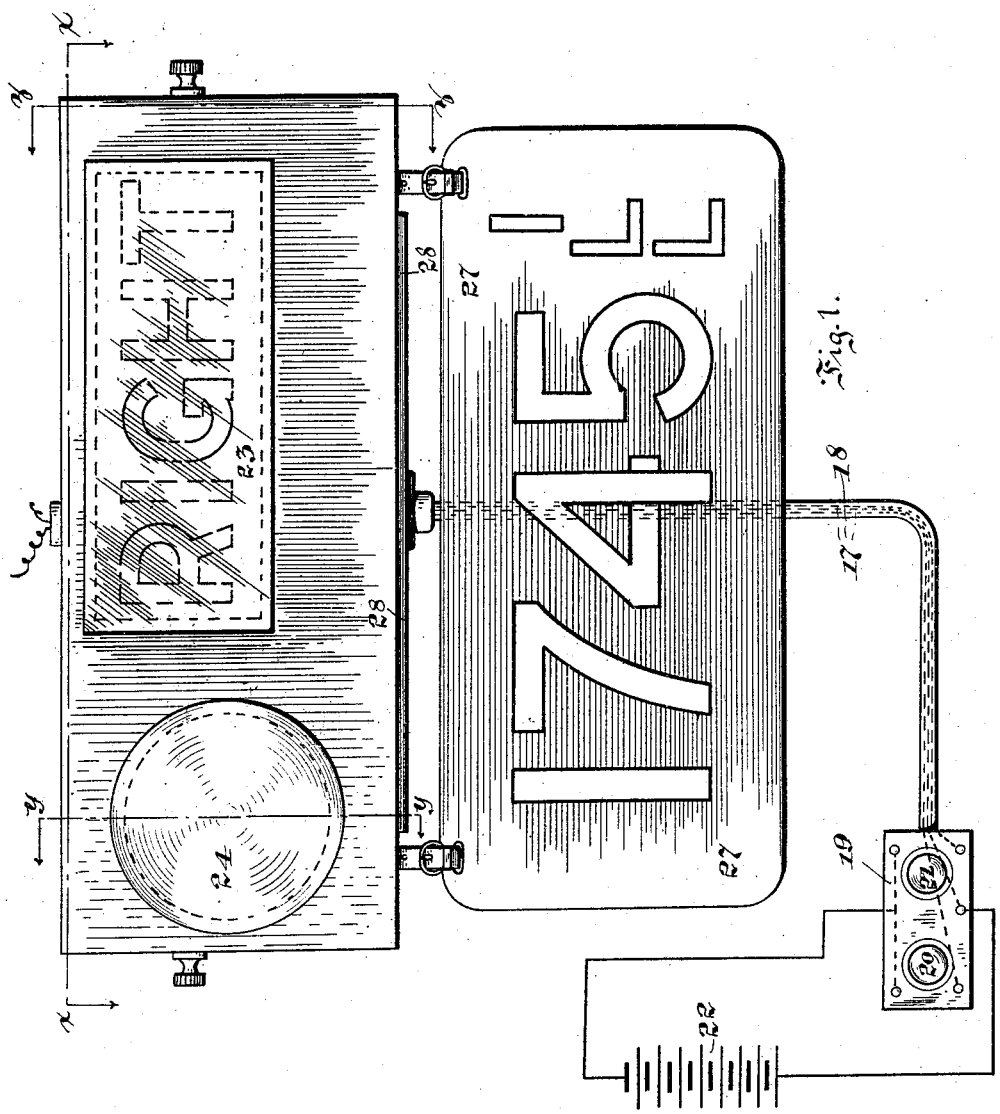

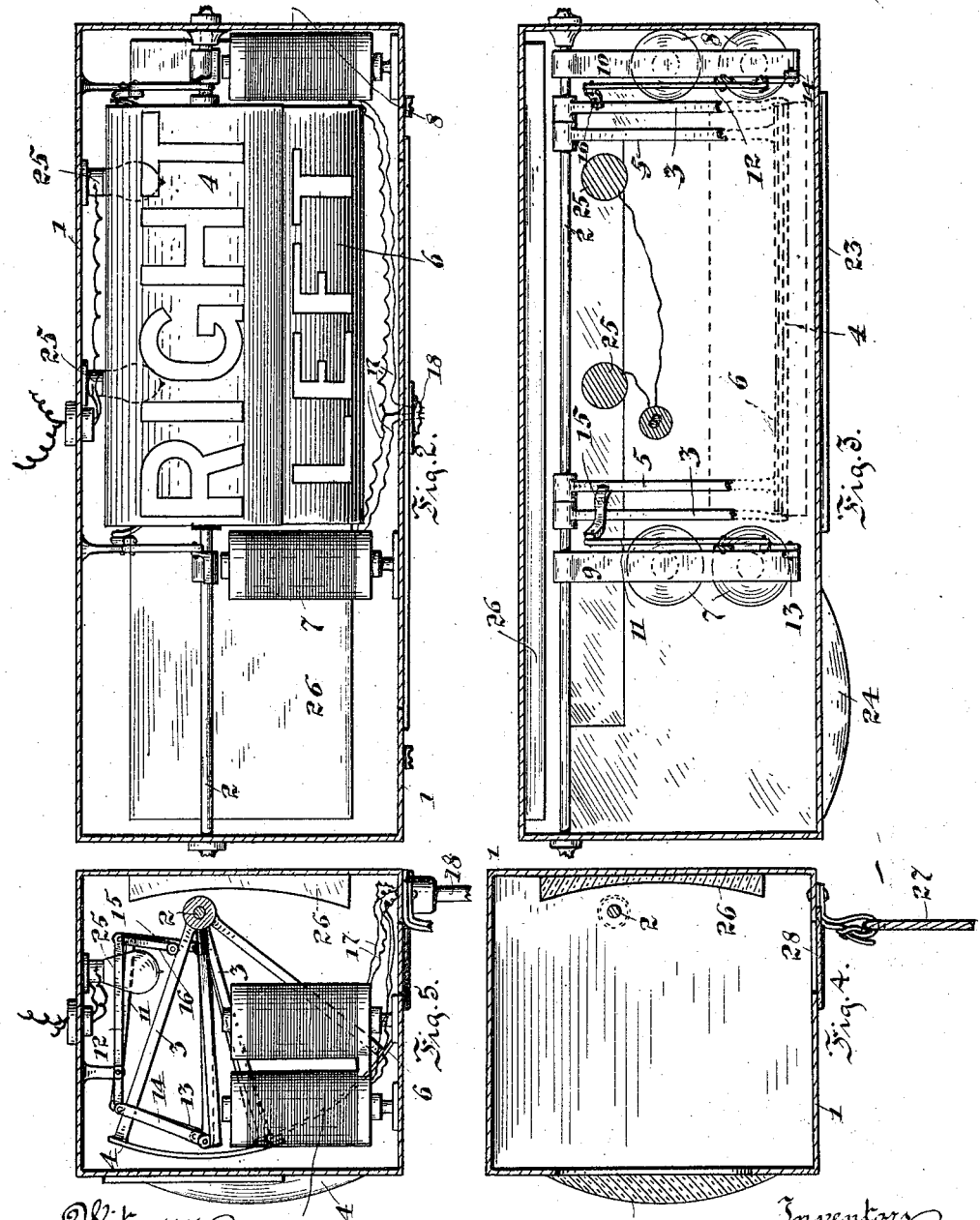

UNITED STATES PATENT OFFICE.

EDWARD J. BEST AND CHARLES M. FITCH, OF CHICAGO, ILLINOIS.

VEHICLE-SIGNAL.

1,028,854.  Specification of Letters Patent.  Patented June 11, 1912.

Application filed December 27, 1910. Serial No. 599,318.

*To all whom it may concern:*

Be it known that we, EDWARD J. BEST and CHARLES M. FITCH, citizens of the United States, and residents of the city of Chicago, county of Cook, and State of Illinois, have invented certain new and useful Improvements in Vehicle-Signals, of which the following is a specification.

Our invention relates to improvements in signals for vehicles and more specifically to rear signals for automobiles, the object of the invention being to provide signals adapted to lessen or eliminate danger of rear end collisions.

The invention consists in a combination and arrangements of parts hereinafter described and claimed.

The invention will be best understood by reference to the accompanying drawings forming a part of this specification, and in which—

Figure 1 is a front elevation of a signal embodying our invention, and showing the electric circuits in diagrammatic view, Fig. 2, a front view of the signal casing with the front wall removed, Fig. 3, a section of the device taken on line *x—x* of Fig. 1, Fig. 4, a section of the device taken on line *y—y* of Fig. 1, and Fig. 5, a section of the device taken on line *z—z* of Fig. 1.

The preferred form of construction as illustrated in the drawings, comprises a suitable casing 1 which may be of sheet metal or other suitable material and is adapted to be suspended or otherwise secured to the rear of an automobile or other vehicle. A rod 2 traverses the front portion of said casing. A pair of spaced brackets 3 are pivoted on rod 2 and carry at their outer ends a convex transparent semaphore signal sign 4 bearing the word "Right" as indicated, said sign being made to exhibit said word in red when illuminated. Another pair of spaced brackets 5 are mounted between brackets 3 and carry a similar convex transparent semaphore signal sign bearing the word "Left" in a green color when illuminated. Electro-magnets 7 and 8 are arranged at each side of said semaphore signals and armatures 9 and 10 are pivoted on rod 2 and coöperates with said magnets as shown. Levers 11 and 12 are fulcrumed in the casing above armatures 9 and 10 and are connected respectively with the outer ends of said armatures by means of links 13 and 14. The inner end of lever 11 is connected by means of a bent link 15 with one of the brackets 5 and the inner end of lever 12 is connected by means of a link 16 with one of the brackets 3 as shown. Electric wires 17 are connected for separate excitation of magnets 7 and 8 and are passed through a suitable conduit 18 to a button or switchboard 19 which is designed to be located within convenient reach of the driver or operator of the vehicle. The board 19 is provided with buttons 20 and 21 and is so connected with a battery 22 so as to permit the closing of an electric circuit through either of the magnets 7 and 8, as will be readily understood by those skilled in the art. The rear wall of the casing 1 is provided with a clear glass light or plate 23 and a red glass light or plate 24, as shown. The interior of the casing 1 is illuminated by means of electric light bulbs 25, and a reflector 26 is provided on the rear wall of said casing.

In use the casing 1 is suspended or otherwise mounted upon the rear or tail end of an automobile or other vehicle, and if at night, the electric lights 25 are lighted. This supplies the permanent red light tail signal seen through glass 24 which serves the usual function. When the driver decides to turn his vehicle to one side or the other, there is danger of collision with an overtaking vehicle. To lessen or eliminate this danger, the driver indicates on the rear signal by means of one of the buttons 20 or 21 and by exposing the word "Right" or "Left" to correspond with his contemplated turn, the direction in which he proposes to turn, thus giving warning to an overtaking driver who will then easily avoid the collision. In the daytime it is not necessary to illuminate the design, the words "Right" and "Left" appearing thereon in dark colors. A license tag 27 is also suspended from the bottom of casing 1 and the bottom of said casing is slotted and covered with a clear glass light or plate 28 for the purpose of illuminating said tag at night, the top of the casing serving as a reflector for this purpose.

While we have shown what we deem to be the preferred construction for carrying our invention into effect, this is capable of variation without departing from the spirit of the invention. Hence, we desire to avail ourselves of such variations and modifications as come within the scope of the appended claim.

Having described our invention what we claim as new and desire to secure by Letters Patent is:—

A rear signal for automobiles comprising a casing; an electric light in said casing; a clear glass pane in the rear wall of said casing; a rod traversing the front of said casing; a pair of spaced brackets pivoted on said rod and carrying a convex transparent sign arranged to be swung to and away from a position behind said clear glass pane; another pair of spaced brackets pivoted on said rod between said first pair and carrying a convex transparent sign arranged to be swung to and away from a position behind said clear glass pane and behind said first-mentioned sign, one of said signs bearing the word "Right" and the other the word "Left"; an electro-magnet arranged in said casing at each end of said signs; armatures pivoted on said rod and lying over said magnets; a lever fulcrumed above each of said armatures; a link connection between the rearward end of said armatures and said levers; a link connection between the forward ends of each of said levers and one of said pairs of brackets near their pivots; and electric circuits under the control of the driver and arranged to excite said magnets, substantially as described.

In testimony whereof we have signed our names to this specification in the presence of two subscribing witnesses.

EDWARD J. BEST.
CHARLES M. FITCH.

Witnesses:
HELEN F. LILLIS,
JOSHUA R. H. POTTS.